(12) United States Patent
Hsieh et al.

(10) Patent No.: US 8,075,959 B2
(45) Date of Patent: Dec. 13, 2011

(54) LIQUID CRYSTAL DISPLAY PANEL AND COMPOSITION OF LIQUID CRYSTAL LAYER THEREOF

(75) Inventors: Chung-Ching Hsieh, Hsin-Chu (TW); Yang-Chu Lin, Hsin-Chu (TW); Chia-Hsuan Pai, Hsin-Chu (TW); Te-Sheng Chen, Hsin-Chu (TW); Norio Sugiura, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 95 days.

(21) Appl. No.: 12/435,617

(22) Filed: May 5, 2009

(65) Prior Publication Data

US 2009/0324855 A1 Dec. 31, 2009

(30) Foreign Application Priority Data

Jun. 30, 2008 (TW) .............................. 97124672 A

(51) Int. Cl.
*C09K 19/00* (2006.01)
*C09K 19/06* (2006.01)
*C09K 19/32* (2006.01)
*C09K 19/52* (2006.01)

(52) U.S. Cl. ....... 428/1.1; 428/1.3; 430/20; 252/299.01; 252/299.6; 349/167; 349/182

(58) Field of Classification Search ............. 252/299.01, 252/299.6; 428/1.1, 1.3; 349/167, 182; 430/20
See application file for complete search history.

(56) References Cited

U.S. PATENT DOCUMENTS

| 7,198,827 | B1 | 4/2007 | Takeuchi et al. |
| 7,327,433 | B2 | 2/2008 | Miyachi et al. |
| 2003/0160210 | A1 | 8/2003 | Bremer et al. |
| 2005/0116200 | A1 | 6/2005 | Nakanishi et al. |

FOREIGN PATENT DOCUMENTS

| CN | 1350570 A | 5/2002 |
| CN | 1829786 | 9/2006 |
| CN | 101045866 A | 10/2007 |
| CN | 101128566 | 2/2008 |
| CN | 101165557 A | 4/2008 |
| EP | 1411104 A1 | 4/2004 |
| EP | 1591513 A1 | 11/2005 |
| EP | 1903090 A2 | 3/2008 |

*Primary Examiner* — Geraldina Visconti
(74) *Attorney, Agent, or Firm* — Rabin & Berdo, P.C.

(57) ABSTRACT

A liquid crystal display (LCD) panel includes a liquid crystal (LC) layer interposed between top and bottom substrates. The LC layer includes a plurality of LC compounds and a stabilization-aligned polymer polymerized from a plurality of polymerizable monomers and formed on at least one surface of the top substrate or the bottom substrate. The plurality of LC compounds comprise first, second, and third LC compounds in which the third LC compound is selected from the group consisting of a compound 3A, a compound 3B, a compound 3C, and combinations thereof. As seen from the chemical formulae, the plurality of LC compounds have condensed rings so that sensitivity to light and heat is reduced and reliability of the LCD panel is improved.

19 Claims, 2 Drawing Sheets

LIQUID CRYSTAL DISPLAY PANEL AND COMPOSITION OF LIQUID CRYSTAL LAYER THEREOF

This application claims the benefit of Taiwan application Serial No. 97124672, filed Jun. 30, 2008, the subject matter of which is incorporated herein by reference.

BACKGROUND OF THE INVENTION

1. Field of the Invention

The invention relates in general to a liquid crystal display (LCD) panel and a composition of liquid crystal layer thereof, and more particularly to a LCD panel using PSA technology and a composition of liquid crystal layer thereof.

2. Description of the Related Art

Liquid crystal display (LCD) panel, having the features of light weight, low power consumption and low radiation, has been widely used in commercial and consumer electronics to replace conventional cathode ray tube monitor (CRT monitor) and has become a very popular optico-electric device. Currently, the LCD panel is already superior to conventional CRT monitor in terms of power consumption, overall luminance and contrast but is still inferior to conventional CRT monitor in terms of response time.

Recently, a polymer-stabilizing alignment (PSA) technology is provided to mix polymerizable monomers into the liquid crystal layer. After an energy source, such as a UV light or a heat source, is applied such that the polymerizable monomers are arranged and polymerized to form stabilization-aligned polymers to guide the arrangement of the liquid crystal compound of the LCD panel. However, not all of the existing liquid crystal compounds or polymerizable monomers are applicable to the alignment technology. If the mixture of the liquid crystal compound and the polymerizable monomer is unsuitable, the LCD panel which uses the same and is manufactured according to PSA technology will even have negative effects such as slower response rate and deteriorated display quality.

SUMMARY OF THE INVENTION

The invention is directed to a composition of a liquid crystal layer made from specific LC compounds and polymerizable monomers. The composition of the liquid crystal layer has stable overall properties and is applicable to polymer-stabilizing alignment (PSA) technology. The invention is also directed to a liquid crystal display (LCD) panel which uses the above composition of LC layer and PSA technology. The LCD panel of the invention has the advantages of high reliability and fast response rate.

According to a first aspect of the present invention, a LCD panel comprising a bottom substrate, a top substrate and a LC layer interposed therebetween is provided. The LC layer comprises a plurality of LC compounds and a stabilization-aligned polymer. The stabilization-aligned polymer is polymerized by a plurality of polymerizable monomers and formed on at least one surface of the top substrate or the bottom substrate. These LC compounds comprise a first LC compound, a second LC compound and a third LC compound, and the third LC compound is selected from the group consisting of a compound 3A, a compound 3B, a compound 3C and a combination thereof.

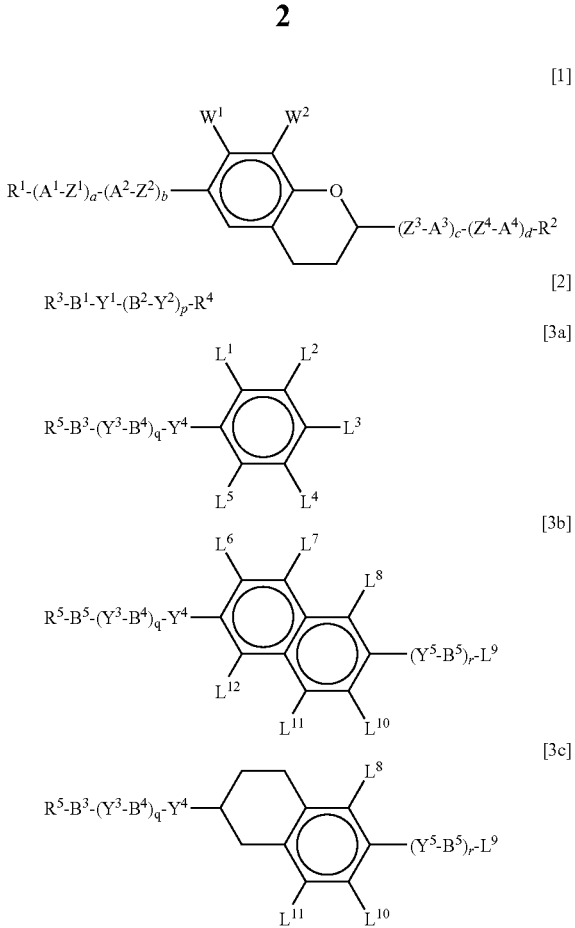

Wherein, "$R^1$", "$R^2$", "$R^3$", "$R^4$" and "$R^5$" independently denote alkyl having 1~12 carbon atoms or alkenyl having 2~12 carbon atoms. "$A^1$", "$A^2$", "$A^3$", "$A^4$", "$B^1$", "$B^2$", "$B^3$", "$B^4$" and "$B^5$" independently denote 1,4-cyclohexylene, 1,4-phenylene, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl. "$Z^1$", "$Z^2$", "$Z^3$", "$Z^4$", "$Y^1$", "$Y^2$", "$Y^3$", "$Y^4$" and "$Y^5$" independently vinyl, methylethyl, dimethylethyl, tetrifluoroethyl, difluorovinyl, methyoxy, methyl methyoxy, butyl, propoxy, ethynyl, difluoromethoxy, carboxyl, carbothio or a single bond. When "$A^1$", "$A^2$", "$A^3$", "$A^4$", "$Z^1$", "$Z^2$", "$Z^3$" and "$Z^4$" respectively exist, their representative groups are the same or different. "a", "b", "c" and "d" independently denote 0 or 1. "$W^1$" and "$W^2$" independently denote fluorine atom, chlorine atom, trifluoromethyl, difluoromethyl, trifluoromethoxy or difluoromethoxy. When "$Y^2$" and "$B^2$" respectively exist, their representative groups are the same or different. "p" denotes 0, 1 or 2. "$L^1$", "$L^2$", "$L^4$", "$L^5$", "$L^6$", "$L^7$", "$L^8$", "$L^{10}$", "$L^{11}$" and "$L^{12}$" independently denote fluorine atom or hydrogen atom. "$L^3$" and "$L^9$" independently denote hydrogen atom, fluorine atom, chlorine atom, cyano group, trifluoromethyl, fluoromethoxy, difluoromethoxy, trifluoromethoxy, trifluoroethyl or the group denoted by "$R^5$".

According to a second aspect of the present invention, a composition of a liquid crystal layer comprising a plurality of polymerizable monomers and a plurality of LC compounds is provided. These LC compounds comprise a first LC compound, a second LC compound and a third LC compound, wherein the third LC compound is selected from the group consisting of the third A compound, the third B compound, the third C compound and a combination thereof.

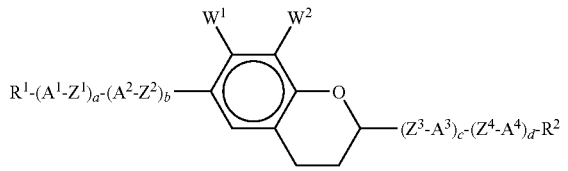

[1]

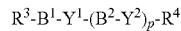

[2]

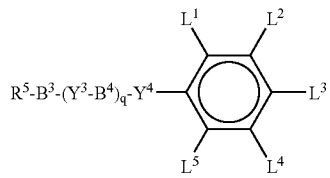

[3a]

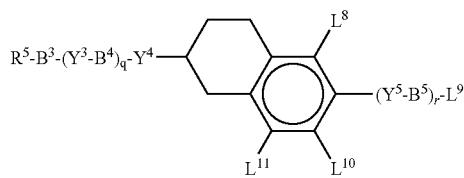

[3b]

[3c]

Wherein, "$R^1$", "$R^2$", "$R^3$", "$R^4$" and "$R^5$" independently denote alkyl having 1~12 carbon atoms or alkenyl having 2~12 carbon atoms. "$A^1$", "$A^2$", "$A^3$", "$A^4$", "$B^1$", "$B^2$", "$B^3$", "$B^4$" and "$B^5$" independently denote 1,4-cyclohexylene, 1,4-phenylene, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl. "$Z^1$", "$Z^2$", "$Z^3$", "$Z^4$", "$Y^1$", "$Y^2$", "$Y^3$", "$Y^4$" and "$Y^5$" independently denote ethyl, vinyl, methylethyl, dimethylethyl, tetrifluoroethyl, difluorovinyl, methoxy, methyl methyoxy, butyl, propoxy, ethynyl, difluoromethoxy, carboxyl, carbothio or a single bond. When "$A^1$", "$A^2$", "$A^3$", "$A^4$", "$Z^1$", "$Z^2$", "$Z^3$" and "$Z^4$" respectively exist, their representative groups are the same or different. "a", "b", "c" and "d" independently denote 0 or 1. "$W^1$" and "$W^2$" independently denote fluorine atom, chlorine atom, trifluoromethyl, difluoromethyl, trifluoromethoxy or difluoromethoxy. When "$Y^2$" and "$B^2$" respectively exist, their representative groups are the same or different. "p" denotes 0, 1 or 2. "$L^1$", "$L^2$", "$L^4$", "$L^5$", "$L^6$", "$L^7$", "$L^8$", "$L^{10}$", "$L^{11}$" and "$L^{12}$" independently denote fluorine atom or hydrogen atom. "$L^3$" and "$L^9$" independently denote hydrogen atom, fluorine atom, chlorine atom, cyano group, trifluoromethyl, fluoromethoxy, difluoromethoxy, trifluoromethoxy, trifluoroethyl or the group denoted by "$R^5$".

The invention will become apparent from the following detailed description of the preferred but non-limiting embodiments. The following description is made with reference to the accompanying drawings.

DETAILED DESCRIPTION OF THE INVENTION

Figure 1:
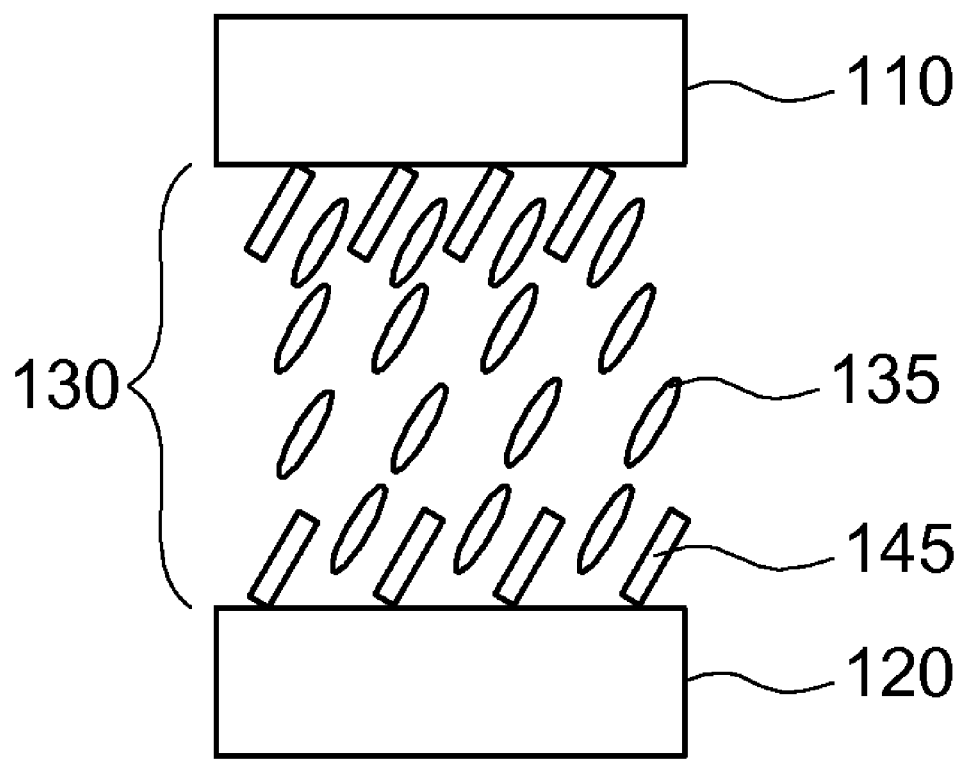
FIG. 1 shows a side view of a LCD panel according to a preferred embodiment of the invention.

The invention is directed to a composition of a liquid crystal layer having high stability. By mixing a liquid crystal compound (LC compound) having stable chemical properties with polymerizable monomers, the overall properties of the composition of LC layer are more stable and applicable to polymer-stabilizing alignment (PSA) technology. Meanwhile, the LCD panel using the composition of the LC layer of the invention has faster response rate. The composition of the LC layer of the invention comprises numerous polymerizable monomers and numerous LC compounds. The LC compounds comprise a first LC compound, a second LC compound and a third LC compound, and the third LC compound is selected from the compound 3A, the compound 3B, the compound 3C or the combination thereof.

The first LC compound is represented as the following chemical formula:

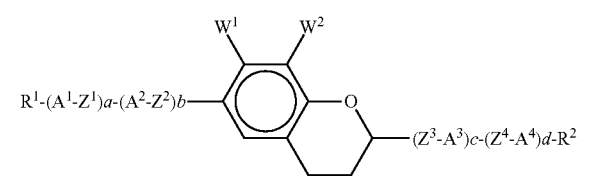

[1]

The second LC compound is represented as the following chemical formula:

[2]

The compound 3A, the compound 3B and the compound 3C are respectively represented as the following chemical formulas:

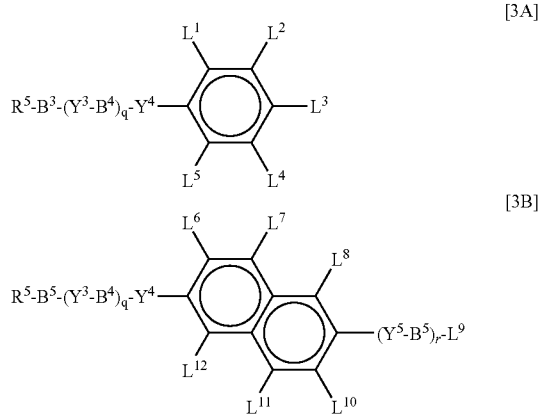

[3A]

[3B]

[3C]

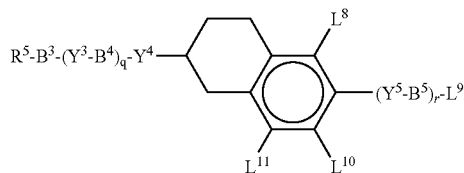

"$R^1$", "$R^2$", "$R^3$", "$R^4$" and "$R^5$" independently denote alkyl having 1~12 carbon atoms or alkenyl having 2~12 carbon atoms. When "$R^1$", "$R^2$", "$R^3$", "$R^4$" and "$R^5$" independently denote alkyl having 1~12 carbon atoms or alkenyl having 2~12 carbon atoms, one group or two non-adjacent —$CH_2$— groups of "$R^1$", "$R^2$", "$R^3$", "$R^4$" and "$R^5$" can be replaced by oxygen atom or sulphur atom. Or, when "$R^1$", "$R^2$", "$R^3$", "$R^4$" and "$R^5$" independently denote alkyl having 1~12 carbon atoms or alkenyl having 2~12 carbon atoms, at least one hydrogen atom of "$R^1$", "$R^2$", "$R^3$", "$R^4$" and "$R^5$" can be replaced by fluorine atom or chlorine atom.

"$A^1$", "$A^2$", "$A^3$", "$A^4$", "$B^1$", "$B^2$", "$B^3$", "$B^4$" and "$B^5$" independently denote 1,4-cyclohexylene, 1,4-phenylene, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl. When "$A^1$", "$A^2$", "$A^3$", "$A^4$", "$B^1$", "$B^2$", "$B^3$", "$B^4$" and "$B^5$" independently denote trans 1,4-cyclohexylene, one group or two non-adjacent —$CH_2$— groups of "$A^1$", "$A^2$", "$A^3$", "$A^4$", "$B^1$", "$B^2$", "$B^3$", "$B^4$" and "$B^5$" can be replaced by oxygen atom or sulphur atom. When "$A^1$", "$A^2$", "$A^3$", "$A^4$", "$B^1$", "$B^2$", "$B^3$", "$B^4$" and "$B^5$" independently denote 1,4-phenylene, at least one —CH— group of "$A^1$", "$A^2$", "$A^3$", "$A^4$", "$B^1$", "$B^2$", "$B^3$", "$B^4$" and "$B^5$" can be replaced by nitrogen atom. When "$A^1$", "$A^2$", "$A^3$", "$A^4$", "$B^1$", "$B^2$", "$B^3$", "$B^4$" and "$B^5$" independently denote 1,2,3,4-tetrahydronaphthalene-2,6-diyl, the hydrogen atom of "$A^1$", "$A^2$", "$A^3$", "$A^4$", "$B^1$", "$B^2$", "$B^3$", "$B^4$" and "$B^5$" can be replaced by —CN or halogen.

"$Z^1$", "$Z^2$", "$Z^3$", "$Z^4$", "$Y^1$", "$Y^2$", "$Y^3$", "$Y^4$" and "$Y^5$" independently denote ethyl (—$CH_2CH_2$—), vinyl (—CH=CH—), methylethyl (—$CH(CH_3)CH_2$—, —$CH_2CH(CH_3)$—), dimethylethyl (—$CH(CH_3)CH(CH_3)$—), tetrifluoroethyl (—$CF_2CF_2$—), difluorovinyl (—CF=CF—), methyoxy (—$OCH_2$—, —$CH_2O$—), methyl methyoxy (—$OCH(CH_3)$—, —$CH(CH_3)O$—), butyl (—$(CH_2)_4$—), propoxy (—$O(CH_2)_3$—, —$(CH_2)_3O$—), ethynyl (—C≡C—), difluoromethoxy (—$CF_2O$—, —$OCF_2$—), carboxyl (—COO—, OCO—), carbothio (—S—CO—, —CO—S—) or a single bond.

When "$A^1$", "$A^2$", "$A^3$", "$A^4$", "$Z^1$", "$Z^2$", "$Z^3$" and "$Z^4$" respectively exist, their representative groups are the same or different.

"a", "b", "c" and "d" independently denote 0 or 1.

"$W^1$" and "$W^2$" independently denote fluorine atom, chlorine atom, trifluoromethyl (—$CF_3$), difluoromethyl (—$CF_2H$), trifluoromethoxy (—$OCF_3$) or difluoromethoxy (—$OCF_2H$).

When "$Y^2$" and "$B^2$" respectively exist, their representative groups are the same or different.

"p" denotes 0, 1 or 2.

"$L^1$", "$L^2$", "$L^4$", "$L^5$", "$L^6$", "$L^7$", "$L^8$", "$L^{10}$", "$L^{11}$" and "$L^{12}$" independently denote fluorine atom or hydrogen atom.

"$L^3$" and "$L^9$" independently denote hydrogen atom, fluorine atom, chlorine atom, cyano group (—CN), trifluoromethyl (—$CF_3$), fluoromethoxy (—$OCH_2F$), difluoromethoxy (—$OCF_2H$), trifluoromethoxy (—$OCF_3$), trifluoroethyl (—$CH_2CF_3$) or the group denoted by "$R^5$".

In the invention, the first LC compound, the compound 3B and the compound 3C all have a condensed ring. A condensed ring compound is a compound in which two or more than two ring structures are fused through two adjacent elements. Examples of most commonly used condensed ring compound include condensed ring aromatic hydrocarbons such as naphthalene, anthracene, phenanthrene formed by fusing several benzene rings. Besides, the substituent groups denoted by "$A^1$", "$A^2$", "$A^3$", "$A^4$", "$B^1$", "$B^2$", "$B^3$", "$B^4$" and "$B^5$" can also independently be selected from substituent or non-substituent condensed ring, structure such as naphthalene and bicyclical alkyl. The composition of the LC layer of the LCD panel of the invention comprises the LC compound with condensed ring and thus has high stability and is not sensitive to the light or the heat. Therefore, the LC layer of the LCD panel of the invention can bear severe manufacturing and operating conditions during the manufacturing process (particularly, the manufacturing process using UV light or high-temperature polymer alignment technology) and the product using the LC layer of the LCD panel of the invention has higher reliability.

On the other hand, the polymerizable monomers are selected from one of compound I, II, III, IV, V. The compound I is represented in the following chemical formula:

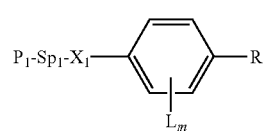

[I]

The compound II is represented as the following chemical formula:

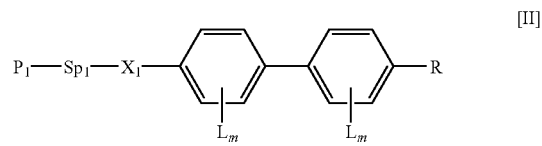

[II]

The compound III is represented as the following chemical formula:

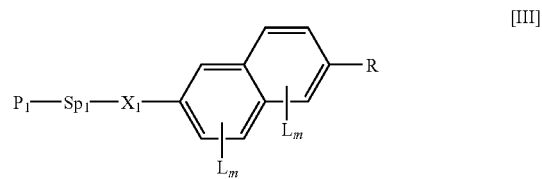

[III]

The compound IV is represented as the following chemical formula:

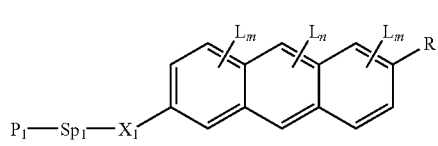

[IV]

The compound V is represented as the following chemical formula:

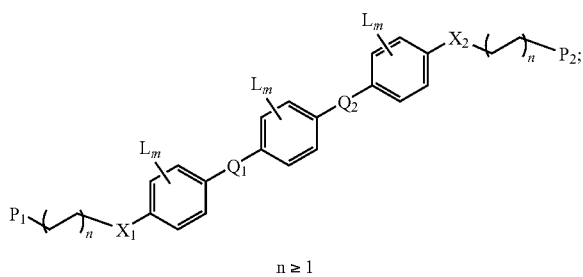

[V]

n ≥ 1

"R" is hydrogen atom, fluorine atom, chlorine atom, cyano group (—CN), thiocyanato (—SCN), pentafluoro-lambda~6~-sulfanyl (—SF$_5$H), nitrite (—NO$_2$), straight-chain or branched-chain alkyl group having 1~12 carbon atoms or X$_2$-Sp$_2$-P$_2$ group. When the polymerizable monomer "R" is a straight-chain or branched-chain alkyl group with 1~12 carbon atoms, one or two non-adjacent —CH$_2$— groups of "R" can be replaced by oxygen atom, sulphur atom, vinylene (—CH=CH—), carbonyl (C=O), carboxyl (—COO—), carbothio (S—CO—, —CO—S—) or alkyne.

"X$_1$" and "X$_2$" independently denote oxygen atom, sulphur atom, methyoxy (—OCH$_2$—), carbonyl (C=O), carboxyl (—COO—), carbamoyl (—CO—N$^O$R—, —N$^O$R—CO—), methylthio (—CH$_2$S—, —SCH$_2$—), ethenylcarbonyl (—CH=CH—COO—), carbonylethenyl (—COO—CH=CH—) or a single bond.

"Sp$_1$" and "Sp$_2$" independently denote a spacer or have a single bond;

"L$_m$" and "L$_n$" respectively denote hydrogen atom, fluorine atom, chlorine atom, cyano group, alkyl, alkylcarbonyl, alkoxycarbonyl or alkylcarbonyloxy with 1~7 carbon atoms, wherein m≧1 and n≧1. When the polymerizable monomer "L$_m$" is alkylcarbonyloxy with 1~7 carbon atoms, one or more than one hydrogen atom of "L$_m$" can be replaced by fluorine atom or chlorine atom.

"Q$_1$" and "Q$_2$" respectively and independently denote oxygen atom, sulphur atom, carbonyl (C=O), carboxyl (—COO—), methyoxy (—OCH$_2$—), methylthio (methylthio, —CH$_2$S—), ethenylcarbonyl (—CH=CH—COO—), carbonylethenyl (—COO—CH=CH—), difluoromethoxy (—CF$_2$O—, —OCF$_2$—), difluoro methylthio (—CF$_2$S—, —SCF$_2$—), ethyl (—C$_2$H$_4$—), difluoroethane (—CF$_2$CH$_2$—, —CH$_2$CF$_2$—), tetrifluoroethyl (—CF$_2$CF$_2$—), vinylene (—CH=CH—), difluoroethenylene (—CF=CF—), ethynyl (—C≡C—) or have a single bond.

"P$_1$" and "P$_2$" respectively denote a polymerizable group selected from one of the groups VI, VII, VII, IX and X. The group VI is represented as the following chemical formula, wherein "U" is selected from hydrogen atom, methyl, fluorine atom, trifluoromethyl (—CF$_3$) and phenyl.

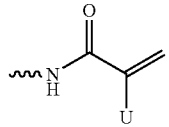

[VI]

The group VII is represented as the following chemical formula, wherein "T" is selected from hydrogen atom, methyl, fluorine atom, trifluoromethyl and phenyl.

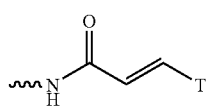

[VII]

The group VII is pyrrole-2,5-dione and is represented as the following chemical formula:

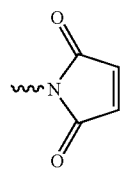

[VII]

The group IX is represented as the following chemical formula, wherein "Y" is selected from hydrogen atom, methyl, fluorine atom, trifluoromethyl and phenyl.

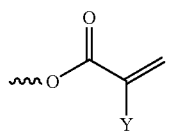

[IX]

The group X is represented as the following chemical formula, wherein "M" is selected from hydrogen atom, methyl, fluorine atom, trifluoromethyl and phenyl.

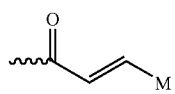

[X]

The composition of the LC layer of the invention can be used in polymer-stabilizing alignment (PSA) technology. Firstly, the abovementioned LC composition is interposed between two substrates. Next, a voltage is applied to the two substrates such that the polymerizable monomers are arranged along with the LC compound. Meanwhile, an energy source (such as UV light or heat source) is applied such that the polymerizable monomers are polymerized to form stabilization-aligned polymers under a particular tilt angle. When the voltage is removed, the stabilization-aligned polymer in turns guides the arrangement of the LC compound of the LCD panel, and the LCD panel is thus formed. Referring to FIG. 1, a side view of a LCD panel according to a preferred embodiment of the invention is shown. The LCD panel of a preferred embodiment of the invention comprise a top substrate 110, a bottom substrate 120 and a LC layer interposed therebetween 130. The LC layer comprises numerous LC compounds 135 and a stabilization-aligned polymer 145. These polymerizable monomers are polymerized to form the stabilization-aligned polymer 145 on at least one surface of the top substrate 110 or the bottom substrate 120 according to PSA technology for guiding the LC compound 135 and the substrate to form a pretilt angle. Preferably, the surface roughness of the stabilization-aligned polymer 145 approximately ranges between 10~20 nm. The LC compound 135 comprise a first LC compound, a second LC compound and a third LC compound, and the third LC compound is selected from the compound 3A, the compound 3B, the compound 3C or a combination thereof. Except for the differences in the stabilization-aligned polymer and the polymerizable monomers, the composition of the LC layer of the LCD panel of the invention is basically the same with the LC composition disclosed above, and is not repeated here.

The properties of the composition of the LC layer and the LCD panel using the same are exemplified by a LC composition of a preferred embodiment of the invention, and the relationship between the composition of the LC material and the properties of the LCD panel is further explored below.

The LC material of the present embodiment of the invention comprises seven LC compounds and one type of polymerizable monomer. The polymerizable monomer is a compound IV-1 or belongs to the compound IV, wherein "$L_m$" and "$L_n$" respectively denote hydrogen atom, m=3, n=2, "R" is $X_2$-$Sp_2$-$P_2$group, "$X_1$", "$X_2$", "$Sp_1$" and "$Sp_2$" are respectively a single bond, "$P_1$" and "$P_2$" are group IX, and "Y" of the group IX is hydrogen atom. The chemical formula of the compound IV-1 is disclosed below:

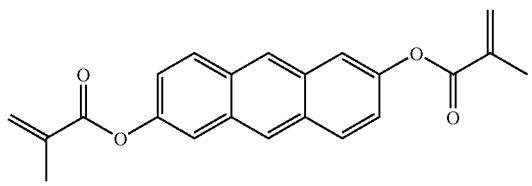

[IV-1]

The chemical formulas of the seven LC compounds comprise the compounds [1-1], [2-1], [2-2], [3a-1], [3b-1] and [3b-2] and are disclosed below. To simplify the chemical formulas and compare the above compounds to particular categories, in the following compounds, "R" and "R'" independently denote alkyl having 1~12 carbon atoms or alkenyl having 2~12 carbon atoms.

The compound [1-1] belongs to the first LC compound, "$W^1$" and "$W^2$" are both fluorine atom, b, c, d=0, a=1, "$Z^1$" are methoxy, "$A^1$" is trans 1,4-cyclohexylene, "$R^1$" is alkyl having 1~12 carbon atoms or alkenyl with 2~12 carbon atoms (denoted by "R"), and "$R^2$" is alkyl having 1~12 carbon atoms or alkenyl having 2~12 carbon atoms (denoted by "R'").

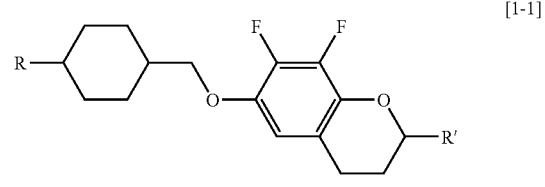

[1-1]

The compound [2-2] belongs to the second LC compound, "$R^4$" is vinyl, p=1, "$B^1$" and "$B^2$" are trans 1,4-cyclohexylene, "$Y^1$" and "$Y^2$" are respectively a single bond, "$R^3$" is alkyl having 1~12 carbon atoms or alkenyl having 2~12 carbon atoms (denoted by 'R').

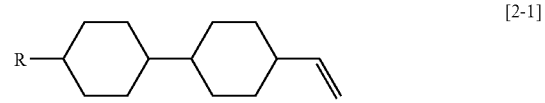

[2-1]

The compound [2-2] belongs to the second LC compound, p=1, "$Y^2$" is vinyl, "$B^1$" and "$B^2$" are trans 1,4-cyclohexylene, "$Y^1$" is a single bond, "$R^3$" is alkyl having 1~12 carbon atoms or alkenyl having 2~12 carbon atoms (denoted by 'R'), and "$R^2$" is alkyl having 1~12 carbon atoms or alkenyl having 2~12 carbon atoms (denoted by 'R'').

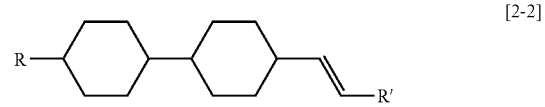

[2-2]

The compound [3a-1] belongs to the compound 3A, "$L^1$", "$L^2$", "$L^4$" and "$L^5$" are all hydrogen atom, "$Y^4$" has a single bond, q=0, "$B^3$" is trans 1,4-phenylene, "$R^5$" is alkyl having 1~12 carbon atoms or alkenyl having 2~12 carbon atoms (denoted by 'R'), and "$L^3$" is alkyl having 1~12 carbon atoms or alkenyl having 2~12 carbon atoms (denoted by 'R'').

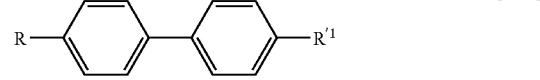

[3a-1]

The compound [3a-2] belongs to the compound 3A, "$L^1$", "$L^2$", "$L^4$" and "$L^5$" are all hydrogen atom, "$Y^4$" is a single bond, q=1, "$B^4$" is trans 1,4-cyclohexylene or 1,4-phenylene (trans 1,4-cyclohexylene and 1,4-phenylene have different structures but are denoted as

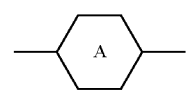

in the following chemical formulas), "$Y^3$" is a single bond, "$B^3$" is trans 1,4-cyclohexylene, and "$R^5$" is vinyl, "$L^3$" is alkyl having 1~12 carbon atoms or alkenyl having 2~12 carbon atoms (denoted by "R").

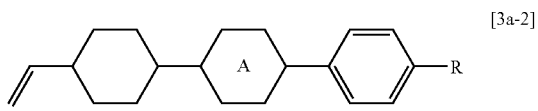

[3a-2]

The compound [3b-1] belongs to the compound 3B, "$L^6$", "$L^7$" and "$L^8$" are fluorine atom, "$L^{10}$", "$L^{11}$" and "$L^{12}$" are hydrogen atom, r=0, "$Y^4$" is methyoxy, q=0, "$B^3$" is trans 1,4-cyclohexylene, "$R^5$" is alkyl having 1~12 carbon atoms or alkenyl having 2~12 carbon atoms (denoted by 'R'), and "$L^9$" is alkyl having 1~12 carbon atoms or alkenyl having 2~12 carbon atoms (denoted by "R'").

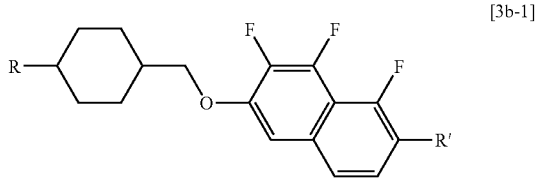

[3b-1]

The compound [3b-2] belongs to the compound 3B, "$L^6$", "$L^7$" and "$L^8$" are fluorine atom, "$L^{10}$", "$L^{11}$" and "$L^{12}$" are hydrogen atom, r=0, "$Y^4$" is methyoxy, q=1, "$B^4$" is trans 1,4-cyclohexylene, "$Y^3$" is a single bond, "$B^3$" is trans 1,4-cyclohexylene, "$R^5$" is alkyl having 1~12 carbon atoms or alkenyl having 2~12 carbon atoms (denoted by 'R'), and "$L^9$" is alkyl having 1~12 carbon atoms or alkenyl having 2~12 carbon atoms (denoted by "R'").

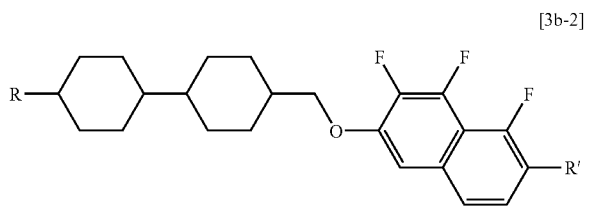

[3b-2]

Two groups of LC material are used as contrast groups. The first contrast group comprises a conventional LC compound and a polymerizable monomer IV-1. The conventional LC compound does not comprise any condensed ring structure, and the structure of the conventional LC compound is represented as follows:

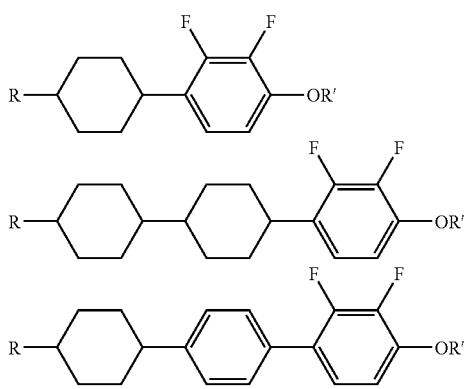

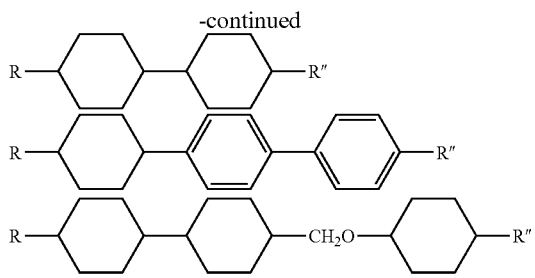

Wherein, "R" and "R'" independently denote alkyl with 1~12 carbon atoms, and "R''" is alkyl with 1~12 carbon atoms or alkoxy.

The LC material of the second contrast group is formed by mixing the conventional LC compound with the polymerizable monomer II-1. The conventional LC compound is the same with the LC compound of the first contrast group, and the polymerizable monomer II-1 belongs to the compound II, wherein "$L_m$" is hydrogen atom, m=4, "R" is $X_2$-$Sp_2$-$P_2$group, "$X_1$", "$X_2$", "$Sp_1$" and "$Sp_2$" are respectively a single bond, and "$P_1$" and "$P_2$" belong to the group IX whose "Y" is hydrogen atom. The chemical formula of the polymerizable monomer II-1 is disclosed below:

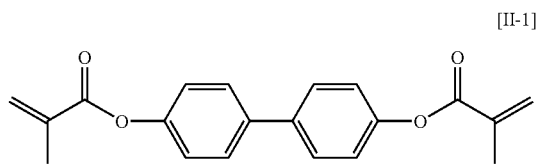

[II-1]

The contrast groups are used as a reference in the analysis of results. According to the analysis of the properties of the LC material of the present embodiment of the invention and that of the two contrast groups, the three groups are similar in the properties of optical anisotropy and dielectric anisotropy but differ largely in nematic-isotropic phase-transition temperature (Tni) and rotational viscosity ($\gamma^1$). The rotational viscosity ($\gamma^1$) of the LC material of the present embodiment of the invention is 81 mPa*s far below the rotational viscosity of conventional material (the first contrast group and the second contrast group) which reads 141 mPa*s. This implies that the LC material of the present embodiment of the invention has smaller resistance during rotation and the response time can thus be shortened. Furthermore, the nematic-isotropic phase-transition temperature of the LC material of the present embodiment of the invention is 79.3° C. far higher than that of the conventional LC material (the first contrast group and the second contrast group) which reads as 70° C. The nematic-isotropic phase-transition temperature refers to the temperature at which the LC compound is converted to a liquid state from a liquid crystal state. The LC compound in liquid state does not have optical anisotropy and also the ability to change brightness of the panel. The higher the nematic-isotropic phase-transition temperature a LC material is, the higher the threshold temperature at which the LC material loses its function will be. Thus, compared to the conventional LCD panel, the LCD panel of the invention can be operated within a wider temperature range and has higher reliability.

After the abovementioned LC material is mixed and completed, the LCD panel manufactured from the LC material by the PSA technology is used as the experiment group. The LCD panel used in the contrast group is manufactured from the conventional LC material (the conventional LC compound combined with the same polymerizable monomer) according to the same manufacturing method.

Then, the LC panel of the present embodiment of the invention and the LCD panels of the two contrast groups are respectively tested. Under different driving voltages, the response time ($T_{on}$) for the LC compound to be rotated to a predetermined position from a starting position is measured and illustrated in FIG. 2. The squared data points and the curve connected thereto denote the performance of the second contrast group (the conventional LC compound+the polymerizable monomer II-1), the circular data points and the curve connected thereto denote the performance of the first contrast group (the conventional LC compound+the polymerizable monomer IV-1), and the triangular data points and the curve connected thereto denote the performance of the experiment group (the LC compound of the preferred embodiment+the polymerizable monomer IV-1).

The comparison between the experiment group and the first contrast group shows that the experiment group and the first contrast group are much the same in the response time, and the LC materials of the two groups mainly differ in the composition of the LC compound. Despite the response time for the experiment group and the response time for the first contrast group are much the same, when a voltage ranging between 4V and 6V is applied thereto, the LCD panel of the present embodiment of the invention has a shorter response time ($T_{on}$) and faster response rate than the first contrast group. This experimental result corresponds to the result of rotational viscosity. That the LC material of the present embodiment of the invention has a lower rotational viscosity implies that the LC compound has smaller resistance during rotation and the response time can be further reduced. Thus, the LCD panel of the present embodiment of the invention has shorter response time and faster response rate. As the response time can be further reduced, the LC compound of the present embodiment of the invention is superior to the conventional LC compound.

Figure 2:
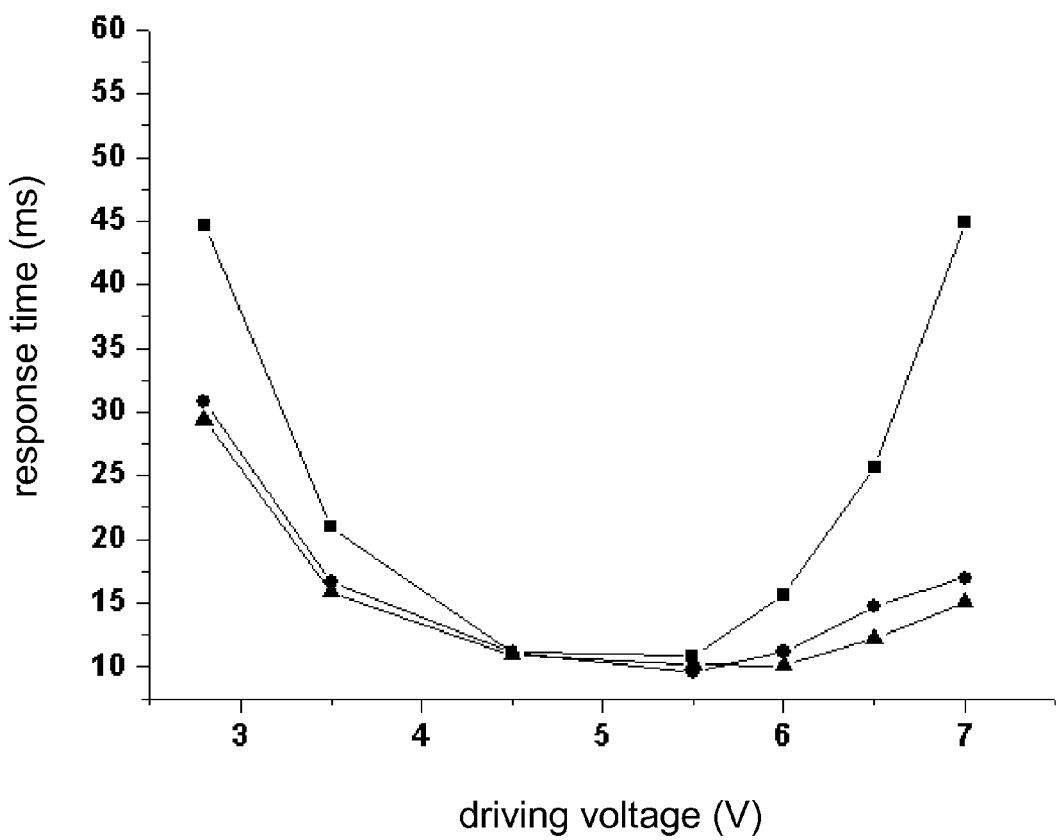
FIG. 2 shows a comparison of relationship curves of response time vs. driving voltage between an experiment group and two contrast groups.

Also, referring to FIG. 2, the comparison between the first contrast group and the second contrast group shows that the response time for the second contrast group is obviously lower than the response time for the first contrast group. As the LC materials used in the two groups mainly differ in the variety of monomer, it is concluded that the polymerizable monomer IV-1 produces better effect than the polymerizable monomer II-1.

To summarize, the LCD panel using the LC compound of the present embodiment of the invention has shorter response time and faster response rate, therefore the response time can be reduced. The LC compound of the preferred embodiment is preferably combined with the polymerizable monomer IV-1. The LCD panel manufactured from the LC material whose composition comprises the LC compound of the preferred embodiment and the polymerizable monomer IV-1 has the shortest response time and fastest response rate.

The LCD panel and composition of LC layer thereof disclosed in the above embodiments of the invention have the following advantages.

The LC material has high stability. The first LC compound, the compound 3B and the compound 3C of the invention all have condensed rings. Besides, the substituent groups "$A^1$", "$A^2$", "$A^3$", "$A^4$", "$B^1$", "$B^2$", "$B^3$", "$B^4$" and "$B^5$" can also independently be selected from substituent or non-substituent condensed ring structure, such as naphthalene and bicyclical alkyl. The composition of the LC layer of the LCD panel of the invention comprises the LC compound with condensed ring and thus has high stability and is not sensitive to the light or the heat. Therefore the LC layer of the LCD panel of the invention can bear severe manufacturing and operating conditions during the manufacturing process (particularly, the manufacturing process using UV light or high-temperature polymer alignment technology) and the product using the LC layer of the LCD panel of the invention has higher reliability.

The LC material has high nematic-isotropic phase-transition temperature. The nematic-isotropic phase-transition temperature refers to the temperature at which the LC compound is converted to a liquid state from a liquid crystal state. The LC compound in liquid state does not have optical anisotropy and the ability to change the brightness. The higher the nematic-isotropic phase-transition temperature a LC material is, the higher the threshold temperature at which the LC loses its function will be. Thus, compared to the conventional LCD panel, the LCD panel of the invention can be operated in a larger range of temperature and has higher reliability.

The LC material has small rotational viscosity. Experimental results show that the LC material of the present embodiment of the invention has a lower rotational viscosity and this implies that the LC compound has smaller resistance during rotation and the response time can be further reduced. Thus, the LCD panel of the present embodiment of the invention has shorter response time and faster response rate and the response time can be further reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
a bottom substrate and a top substrate; and
a liquid crystal (LC) layer interposed between the top substrate and the bottom substrate,
wherein the LC layer is comprised of a plurality of LC compounds and a stabilization-aligned polymer,
wherein the stabilization-aligned polymer is polymerized from a plurality of polymerizable monomers and formed on at least one surface of the top substrate or the bottom substrate,
wherein the LC compounds comprise a first LC compound, a second LC compound, and a third LC compound,
wherein the first LC compound is represented by chemical formula (1) as follows:

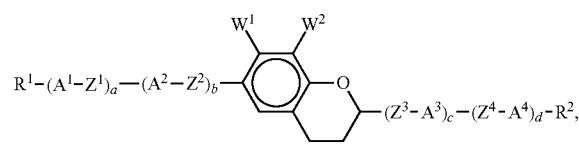

(1)

wherein the second LC compound is represented by chemical formula (2) as follows:

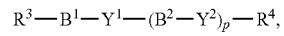

(2)

the third LC compound being selected from the group consisting of a compound 3A, a compound 3B, a compound 3C, and combinations thereof, wherein the compound 3A, the compound 3B and the compound 3C are respectively represented by chemical formulas (3a), (3b), and (3c) as follows:

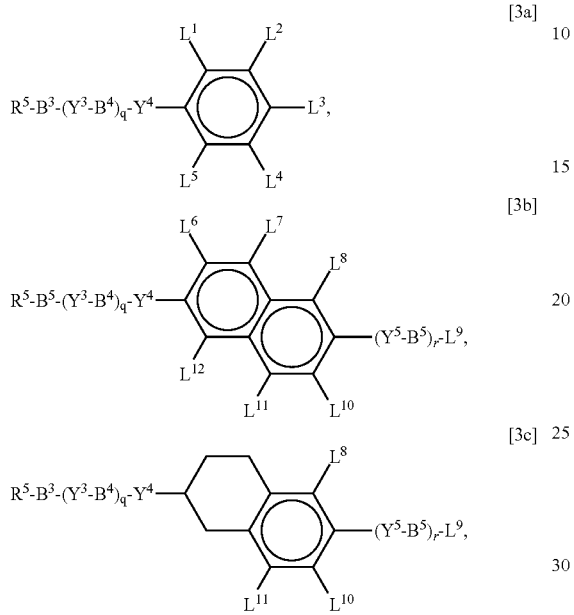

where:
"$R^1$", "$R^2$", "$R^3$", "$R^4$" and "$R^5$" independently denote an alkyl group having 1~12 carbon atoms or an alkenyl group having 2~12 carbon atoms;
"$A^1$", "$A^2$", "$A^3$", "$A^4$", "$B^1$", "$B^2$", "$B^3$", "$B^4$" and "$B^5$" independently denote 1,4-cyclohexylene, 1,4-phenylene, 1,4-cyclohexenylene, 1,4-bicyclo[2.2.2] octylene, piperidine-1,4-diyl, naphthalene-2,6-diyl, decahydronaphthalene-2,6-diyl or 1,2,3,4-tetrahydronaphthalene-2,6-diyl;
"$Z^1$", "$Z^2$", "$Z^3$", "$Z^4$", "$Y^1$", "$Y^2$", "$Y^3$", "$Y^4$" and "$Y^5$" independently denote ethyl, vinyl, methylethyl, dimethylethyl, tetrifluoroethyl, difluorovinyl, methoxy, methyl methyoxy, butyl, propoxy, ethynyl, difluoromethoxy, carboxyl, carbothio or a single bond;
when "$A^1$", "$A^2$", "$A^3$", "$A^4$", "$Z^1$", "$Z^2$", "$Z^3$" and "$Z^4$" respectively exist, their representative groups are the same or different;
"a", "b", "c" and "d" independently denote 0 or 1;
"$W^1$" and "$W^2$" independently denote a fluorine atom, a chlorine atom, a trifluoromethyl group, a difluoromethyl group, a trifluoromethoxy group or a difluoromethoxy group;
when "$Y^2$" and "$B^2$" respectively exist, their representative groups are the same or different; and
"p" denotes 0, 1 or 2;
"$L^1$", "$L^2$", "$L^4$", "$L^5$", "$L^6$", "$L^7$", "$L^8$", "$L^{10}$", "$L^{11}$" and "$L^{12}$" independently denote a fluorine atom or a hydrogen atom;
"$L^3$" and "$L^9$" independently denote a hydrogen atom, a fluorine atom, a chlorine atom, a cyano group, a trifluoromethyl group, a fluoromethoxy group, a difluoromethoxy group, a trifluoromethoxy group, a trifluoroethyl group or the group denoted by "$R^5$", and wherein the polymerizable monomers are selected from the group consisting of one of the compounds I, II, III, IV, and V represented respectively by chemical formulae (I), (II), (III), (IV), and (V) as follows:

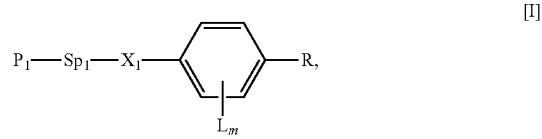

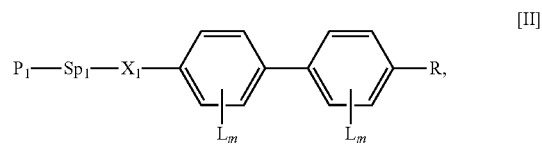

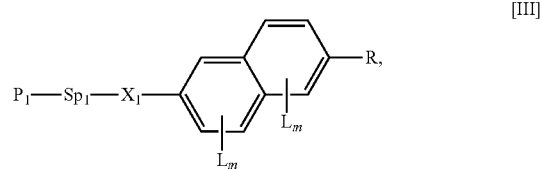

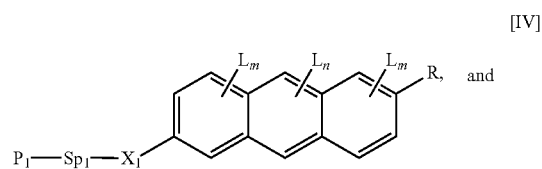

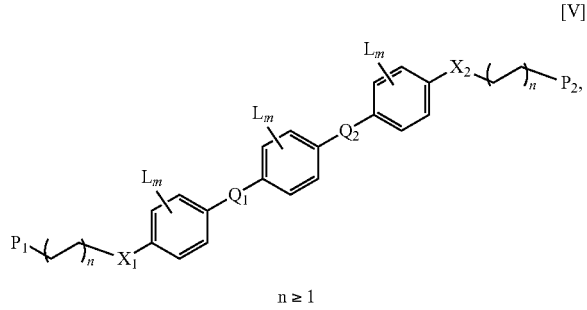

n ≥ 1 where:
"R" is a hydrogen atom, a fluorine atom, a chlorine atom, a cyano group, a thiocyanato group, a pentafluoro-lambda~6~-sulfanyl group, a nitrite group, a straight-chain or branched-chain alkyl group having 1~12 carbon atoms or an $X_2$-$Sp_2$-$P_2$ group;
"$X_1$" and "$X_2$" independently denote an oxygen atom, a sulfur atom, a methyoxy group, a carbonyl group, a carboxyl group, a carbamoyl group, a methylthio group, an ethenylcarbonyl group, a carbonylethenyl group or a single bond;

"Sp$_1$" and "Sp$_2$" independently denote a spacer or a single bond;

"L$_m$" and "L$_n$" respectively denote a hydrogen atom, a fluorine atom, a chlorine atom, a cyano group, an alkyl group, an alkylcarbonyl group, an alkoxycarbonyl group or an alkylcarbonyloxy group having 1~7 carbon atoms, wherein m≧1 and n≧1;

"Q$_1$" and "Q$_2$" respectively and independently denote an oxygen atom, a sulfur atom, a carbonyl group, a carboxyl group, a methyoxy group, a methylthio group, an ethenylcarbonyl group, a carbonylethenyl group, a difluoromethoxy group, a difluoro methylthio group, an ethyl group, a difluoroethyl group, a tetrifluoroethyl group, a vinyl group, a difluorovinyl group, an ethynyl group or a single bond; and "P$_1$" and "P$_2$" respectively denote a polymerizable group.

2. The LCD panel according to claim 1, wherein, when "R$^1$", "R$^2$", "R$^3$", "R$^4$" and "R$^5$" independently denote an alkyl group having 1~12 carbon atoms or an alkenyl group having 2~12 carbon atoms, one or two non-adjacent —CH$_2$— groups of "R$^1$", "R$^2$", "R$^3$", "R$^4$" and "R$^5$" are replaced by an oxygen atom or a sulfur atom.

3. The LCD panel according to claim 1, wherein, when "R$^1$", "R$^2$", "R$^3$", "R$^4$" and "R$^5$" independently denote an alkyl group having 1~12 carbon atoms or an alkenyl group having 2~12 carbon atoms, at least one hydrogen atom is replaced by a fluorine atom or a chlorine atom.

4. The LCD panel according to claim 1, wherein, when "A$^1$", "A$^2$", "A$^3$", "A$^4$", "B$^1$", "B$^2$", "B$^3$", "B$^4$" and "B$^5$" independently denote trans 1,4-cyclohexylene, one or two non-adjacent —CH$_2$—groups thereof are replaced by oxygen atom or sulfur atom.

5. The LCD panel according to claim 1, wherein, when "A$^1$", "A$^2$", "A$^3$", "A$^4$", "B$^1$", "B$^2$", "B$^3$", "B$^4$" and "B$^5$" independently denote 1,4-phenylene, at least one —CH— group thereof is replaced by a nitrogen atom.

6. The LCD panel according to claim 1, wherein, when "A$^1$", "A$^2$", "A$^3$", "A$^4$", "B$^1$", "B$^2$", "B$^3$", "B$^4$" and "B$^5$" independently denote 1,2,3,4-tetrahydronaphthalene-2,6-diyl, the hydrogen atoms thereof are replaced by —CN or halogen.

7. The LCD panel according to claim 1, wherein the LC compounds comprise the first LC compound, "W$^1$" and "W$^2$" are fluorine atoms, b, c, d=0, a=1, "Z$^1$" is a methyoxy group, and "A$^1$" is a trans 1,4-cyclohexylene group.

8. The LCD panel according to claim 1, wherein the LC compounds comprise the second LC compound, "R$^4$" is a vinyl group, p=1, "B$^1$" and "B$^2$" are trans 1,4-cyclohexylene groups, and "Y$^1$" and "Y$^2$" are respectively a single bond.

9. The LCD panel according to claim 1, wherein the LC compounds comprise the second LC compound, p=1, "Y$^2$" is a vinyl group, "B$^1$" and "B$^2$" are trans 1,4-cyclohexylene groups, and "Y$^1$" is a single bond.

10. The LCD panel according to claim 1, wherein the LC compounds comprise the compound 3A, "L$^1$", "L$^2$", "L$^4$" and "L$^5$" are hydrogen atoms, "Y$^4$" is a single bond, q=0, and "B$^3$" is a trans 1,4-cyclohexylene group.

11. The LCD panel according to claim 1, wherein the LC compounds comprise the compound 3A, "L$^1$", "L$^2$", "L$^4$" and "L$^5$" are hydrogen atoms, "Y$^4$" is a single bond, q=1, "B$^4$" is a trans 1,4-cyclohexylene group or a 1,4-phenylene group, "Y$^3$" is a single bond, "B$^3$" is a trans 1,4-cyclohexylene group, and "R$^5$" is a vinyl group.

12. The LCD panel according to claim 1, wherein the LC compounds comprise the compound 3B, "L$^6$", "L$^7$" and "L$^8$" are fluorine atoms, "L$^{10}$", "L$^{11}$" and "L$^{12}$" are hydrogen atoms, r=0, "Y$^4$" is a methoxy group, q=0, and "B$^3$" is a trans 1,4-cyclohexyl group.

13. The LCD panel according to claim 1, wherein the LC compounds comprise the compound 3B, wherein "L$^6$", "L$^7$" and "L$^8$" are fluorine atoms, "L$^{10}$", "L$^{11}$" and "L$^{12}$" are hydrogen atoms, r=0, "Y$^4$" is a methyoxy group, q=1, "B$^4$" is a trans 1,4-cyclohexylene group, "Y$^3$" is a single bond, and "B$^3$" is a trans 1,4-cyclohexylene group.

14. The LCD panel according to claim 1, wherein the plurality of polymerizable monomers have a polymerizable group selected from one of groups VI, VII, VIII, IX and X, wherein group VI is represented by chemical formula (VI) as follows:

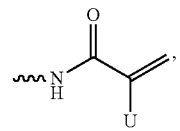

[VI]

where "U" is one of a hydrogen atom, a methyl group, a fluorine atom, a trifluoromethyl group, and a phenyl group, wherein group VII is represented by chemical formula (VII) as follows:

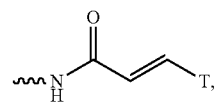

[VII]

where "T" is one of a hydrogen atom, a methyl group, a fluorine atom, a trifluoromethyl group, and a phenyl group, wherein group VIII is a pyrrole-2,5-dione group and is represented by chemical formula (VIII) as follows:

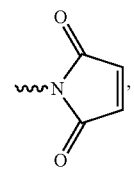

[VIII]

wherein group IX is represented by chemical formula (IX) as follows:

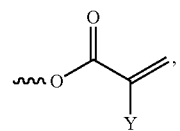

[IX]

where "Y" is one of a hydrogen atom, a methyl group, a fluorine atom, a trifluoromethyl group, and a phenyl group, and wherein group X is represented by chemical formula (X) as follows:

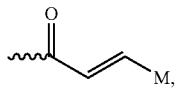 [X]

where "M" is selected from a hydrogen atom, a methyl group, a fluorine atom, a trifluoromethyl group, and a phenyl group.

15. The LCD panel according to claim 1, wherein, when "$L_m$" is an alkylcarbonyloxy group having 1~7 carbon atoms, one or more than one hydrogen atom of "$L_m$" is replaced by a fluorine atom or a chlorine atom.

16. The LCD panel according to claim 1, wherein the "R" is a straight-chain or branched-chain alkyl group having 1~12 carbon atoms, and wherein one or two non-adjacent —$CH_2$— groups of "R" are replaced by an oxygen atom, a sulfur atom, a vinyl group, a carbonyl group, a carboxyl group, a carbothio group, or an alkyne group.

17. The LCD panel according to claim 1, wherein the polymer has a surface roughness that approximately ranges between 10~20 nm.

18. The LCD panel according to claim 1, further comprising an initiator agent that absorbs light energy or heat energy to activate the plurality of polymerizable monomers to polymerize the same, wherein the initiator agent is present in an amount of less than 0.002% of total weight of the LC layer.

19. The LCD panel according to claim 1, wherein the plurality of polymerizable monomers are present in an amount of approximately 0.1~10% of total weight of the LC layer.

* * * * *